United States Patent [19]
Ito

[11] Patent Number: 5,831,702
[45] Date of Patent: Nov. 3, 1998

[54] LIQUID CRYSTAL DISPLAY APPARATUS INTEGRATED WITH TABLET WITH NON-CONDUCTIVE SPACERS AND SMALLER CONDUCTIVE SUBSTANCES IN COMPENSATING LAYER IN TABLET

[75] Inventor: Masaki Ito, Fukushima-ken, Japan

[73] Assignee: Alps Electric Co., Ltd., Japan

[21] Appl. No.: 744,885

[22] Filed: Nov. 6, 1996

[30] Foreign Application Priority Data

Nov. 15, 1995 [JP] Japan ................................. 7-296936

[51] Int. Cl.⁶ .......................... G02F 1/1335; G09G 3/36; G09G 5/00
[52] U.S. Cl. ............................ 349/12; 345/104; 345/175
[58] Field of Search ................. 349/12; 345/104, 345/175

[56] References Cited

U.S. PATENT DOCUMENTS

| | | | |
|---|---|---|---|
| 5,465,103 | 11/1995 | Yoshioka | 345/104 |
| 5,550,659 | 8/1996 | Fujieda et al. | 349/12 |
| 5,640,258 | 6/1997 | Kurashima et al. | 349/12 |
| 5,668,353 | 9/1997 | Matsuda | 345/175 |
| 5,729,319 | 3/1998 | Inou et al. | 349/12 |

*Primary Examiner*—Anita Pellman Gross
*Attorney, Agent, or Firm*—Brinks Hofer Gilson & Lione

[57] ABSTRACT

A liquid crystal display apparatus integrated with a tablet for preventing the undesired color development due to double refraction of light passing the STN liquid crystal display cell from occurring also in high-temperature environment. An STN liquid crystal display cell and a tablet are arranged between a pair of polarizing plates. A compensating liquid crystal layer for canceling the wavelength scattering due to double refraction of light passing the liquid crystal display cell is arranged between opposing coordinates detecting electrodes of this tablet. In addition, nonconductive spacer particles and conductive particles are mixed in the compensating liquid crystal layer.

7 Claims, 2 Drawing Sheets

LIQUID CRYSTAL DISPLAY APPARATUS INTEGRATED WITH TABLET WITH NON-CONDUCTIVE SPACERS AND SMALLER CONDUCTIVE SUBSTANCES IN COMPENSATING LAYER IN TABLET

BACKGROUND OF THE INVENTION

1. Field of the Invention

The present invention relates to a liquid crystal display apparatus integrated with a tablet wherein a liquid crystal display cell of STN (Super Twisted Nematic) type and a table are combined for allowing the user to enter a coordinate signal shown on the display screen by pressing the tablet by the finger or the like. More particularly, the present invention relates to a tablet-integrated liquid crystal display apparatus suitable for use on vehicles expected to operate in high-temperature environment.

2. Description of the Related Art

A display apparatus is known in which a tablet is arranged in front of a liquid crystal display cell to allow a user to make an interactive input operation by pressing the tablet by the finger or the like while looking at the display screen. The tablet is, as is well known, a coordinates input device wherein transparent coordinates detecting electrodes are detachably formed on a transparent upper substrate and a transparent lower substrate on the sides opposite to each other. Pressing the flexible upper substrate at a desired position by the finger or the like flexes the pressed position to make the opposing coordinates detecting electrodes in the flexed range conduct with each other, allowing detection of a coordinate signal that identifies the coordinates of the pressed position. Therefore, arranging this transparent tablet on the display screen of the liquid crystal display cell and pressing the tablet while looking at information shown on the display screen allows the user to enter the coordinates signal of the pressed position in accordance with the displayed information, thereby realizing an interactive input operation with a relatively simple system configuration.

Meanwhile, a liquid crystal cell of STN type widely used on tablet-integrated liquid crystal display apparatuses of the above-mentioned type has a liquid crystal layer between a pair of transparent substrates formed on the opposite sides thereof with transparent electrodes, the liquid crystal layer being oriented in a twisted manner by 180° or more. Consequently, when the white light polarized through a polarizing plate on the back side passes the STN liquid crystal display cell and is projected from the polarizing plate on the front side, hue does not present white because of the influence of wavelength scattering caused by double refraction. For example, the external view color with the positive mode off presents green- or yellow-type hue. Such a color development effect is not desirable in general. Especially, when a color filter is incorporated for color display, this effect affects color development adversely. Consequently, as disclosed in Japanese Examined Patent Publication No. Hei 3-18164 (1991), a compensating liquid crystal layer (a phase difference film to be specific) for canceling the wavelength scattering by double refraction of light passing the STN liquid crystal display cell is added to avoid, as far as possible, the undesired color development effect.

It should be noted that this compensating liquid crystal layer needs to be oriented in an inversely twisted manner relative to the liquid crystal layer of the liquid crystal display cell and product $\Delta n \cdot d$ between refractive index anisotropy $\Delta n$ of the liquid crystal and thickness d of the liquid crystal layer needs to be set in advance. For example, if both of these liquid crystal layers are oriented in inversely twisted manner to each other with absolute values of twist angles being generally equal to each other and the values of $\Delta n \cdot d$ of both liquid crystal layers are set generally equally, the light wavelength scattering caused by passing of light through the liquid crystal layers of the liquid crystal display cell is canceled by the compensating liquid crystal layer.

However, if the conventional interactive display apparatus designed such that the phase difference film is added to the tablet-integrated STN liquid display cell to cancel the wavelength scattering caused by double refraction is used on vehicle for car navigation for example, the phase difference film expands thermally in high-temperature environment (40° C. or higher for example) to lower performance, thereby failing avoidance of undesired color development. Consequently, no good display quality can be obtained.

SUMMARY OF THE INVENTION

It is therefore an object of the present invention to provide a tablet-integrated liquid crystal display apparatus that can prevent color development caused by the double refraction of light passing the STN liquid crystal display cell even in high-temperature environment, thereby always providing good display quality.

In carrying out the invention and according to one aspect thereof, there is provided a tablet-integrated liquid crystal display apparatus comprising: a liquid crystal display cell having a liquid crystal layer oriented in a twisted manner by 180° or more between a pair of transparent substrates formed with transparent electrodes on sides thereof opposite to each other; a tablet arranged on the front side of the liquid crystal display cell; and a pair of polarizing plates arranged on the front and rear sides of a unit composed of the liquid crystal display cell and the tablet; wherein a compensating liquid crystal layer for canceling wavelength scattering caused by double refraction of light passing the liquid crystal cell is arranged between opposing coordinates detecting electrodes of the tablet and nonconductive spacer particles and conductive particles smaller in size than the nonconductive spacer particles are mixed in the compensating liquid crystal layer.

Namely, employment of the liquid crystal cell having the constitution in which the compensating liquid crystal layer is arranged between the coordinates detecting electrodes opposed to each other prevents the wavelength cancel performance anticipated with a phase difference film in high-temperature environment from being deteriorated. Consequently, undesired color development can be avoided to always provide good display quality. In addition, mixing nonconductive spacer particles and conductive particles smaller than the former in particle size in the compensating liquid crystal surely permits a local and selective input operation to make the coordinates detecting electrodes opposed to each other at a position pressed by the finger or the like conduct with each other through the conductive particles. Consequently, the tablet capability is not impaired.

The above and other objects, features and advantages of the present invention will become more apparent from the accompanying drawings, in which like reference numerals are used to identify the same or similar parts in several views.

DESCRIPTION OF THE PREFERRED EMBODIMENTS

This invention will be described in further detail by way of example with reference to the accompanying drawings.

Figure 1:
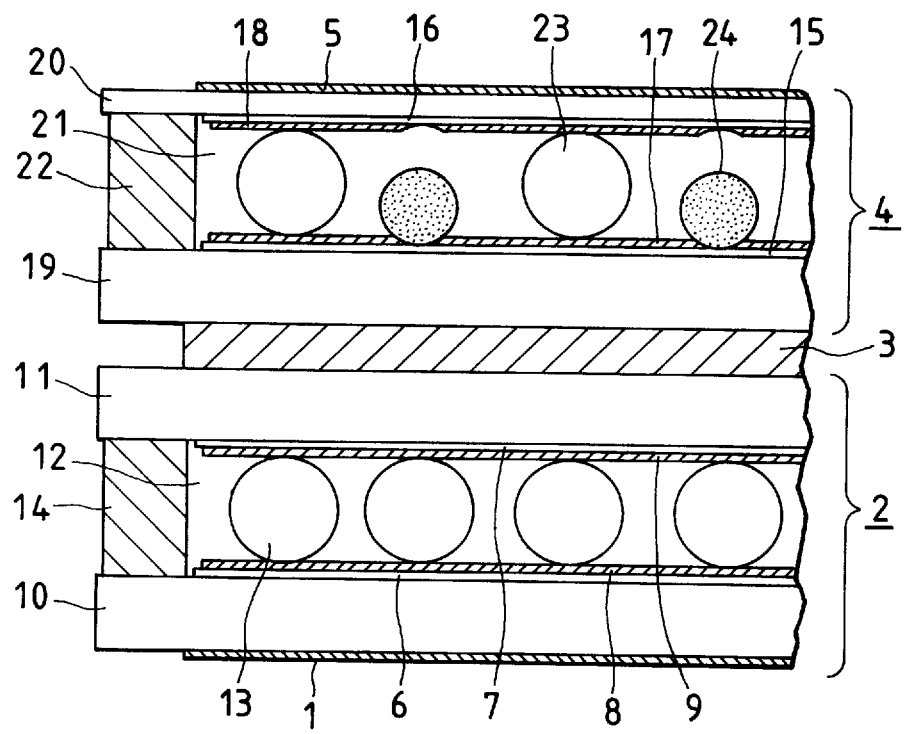
FIG. 1 is an overall cross sectional view illustrating a tablet-integrated liquid crystal display apparatus practiced as one preferred embodiment of the present invention.
Figure 2:
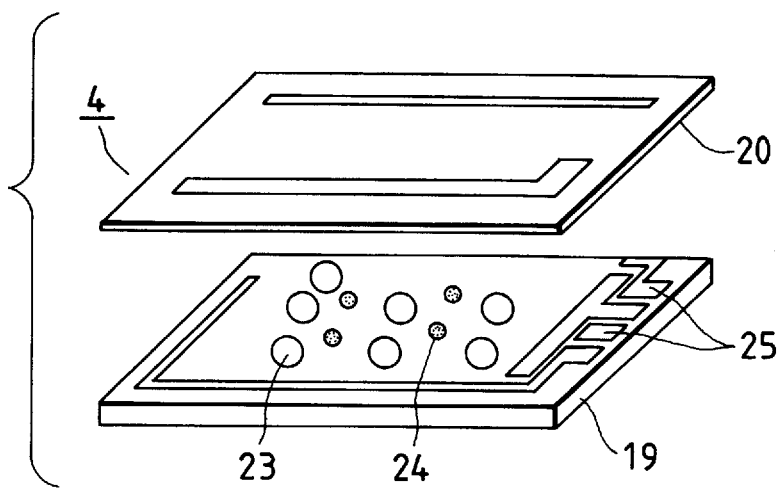
FIG. 2 is an exploded view illustrating the tablet of FIG. 1.

FIGS. 1 and 2 show one preferred embodiment of the tablet-integrated liquid crystal display apparatus according to the present invention. FIG. 1 shows the cross section of the entire apparatus, while FIG. 2 shows the exploded view of the tablet shown in FIG. 1.

The liquid crystal display apparatus integrated with a tablet as shown in FIG. 1 is generally composed of a polarizing plate 1 on the back side, a liquid crystal display cell 2 of STN (Super Twisted Nematic) type, a transparent buffer 3, a tablet 4, and a polarizing plate 5 on the front side in a stacked manner. The STN liquid crystal display cell 2 has an ordinary constitution in which a liquid crystal layer 12 oriented in twisted manner by 180° or more is arranged between an upper glass substrate 11 and a lower glass substrate 10 formed on opposing sides thereof with transparent electrodes 6 and 7 respectively and orientation films 8 and 9 respectively. In the liquid crystal layer 12, spacer particles 13 are scattered for keeping a gap between the upper glass substrate 10 and the lower glass substrate 11 to a predetermined distance. Further, the liquid crystal layer 12 is normally sealed with a sealant 14.

It should be noted that the tablet 4 has a unique constitution in which a compensating liquid crystal layer 21 for canceling the wavelength scattering caused by double refraction of light passing the liquid crystal display cell 2 is arranged between a transparent lower substrate 19 and a transparent upper substrate 20 formed on opposing sides thereof with coordinates detecting electrodes 15 and 16 respectively and orientation films 17 and 18 respectively. The compensating liquid crystal layer 21 is sealed with a sealant 22. In the compensating liquid crystal layer 21, nonconductive spacer particles 23 each made of a elastic plastic bead and conductive particles 24 smaller than the spacer particles 23 in size are mixed and are fixed to the lower substrate 19 as shown also in FIG. 2. Consequently, pressing the resilient upper substrate 20 at a desired position bends that position down to make the opposing coordinates detecting electrodes 15 and 16 conduct with each other through the conductive particles 24 in the range of the pressed position, thereby allowing detection of a coordinates signal that identifies the pressed position.

Referring to FIGS. 1 and 2, the spacer particles 23 and the conductive particles 24 are shown in an exaggerated manner; actually, however, the sizes of these particles 23 and 24 are extremely small and only a small amount thereof needs to be mixed, so that arranging the tablet 4 on the front side of the liquid crystal display cell 2 does not impair visibility. Reference numeral 25 of FIG. 2 indicates a transfer for taking the coordinates detecting electrodes 16 formed on the upper substrate 20 on top of the lower substrate 19 to introduce the coordinates detecting electrodes outside.

In the above-mentioned preferred embodiment, a glass plate of 1.1 mm thick is used for the lower substrate 19 and a glass plate (alternatively, a non-polarizing film) of about 0.15 to 0.2 mm thick is used for the upper substrate 20. For the conductive particles 24, beads obtained by metal-plating plastic beads (alternatively, metal beads) are used. To produce an acting force of about 20 g required of the tablet 4, the difference in diameter between the spacer particle 23 and the conductive particle 24 is set to about one micron.

In what follows, a method of fabricating the above-mentioned tablet 4 will be described.

First, the coordinates detecting electrodes 15 and 16 are formed on one side of the lower substrate 19 and on one side of the upper substrate 20 respectively by means of etching or the like. The electrodes 15 and 16 are partially printed with a silver pattern and the printed silver pattern is dried, thereby providing low resistivity. Then, the orientation films 17 and 18 for orientating the compensating liquid crystal layer 21 are formed on the surfaces of coordinates detecting electrodes 15 and 16 respectively. The spacer particles 23 and the conductive particles 24 are scattered on the lower substrate 19 by means of sprinkling or the like. In doing so, each of the particles 23 and 24 is attached around thereof with thermosetting adhesive in advance. After being sprayed, the particles 23 and 24 are then heated to be fixed to the lower substrate 19. Next, the lower substrate 19 and the upper substrate 20 are glued together at opposing peripheries thereof with the sealant 22 applied thereto in a frame shape. The liquid crystal is injected in the space between both substrates 19 and 20 through a sealing port opened at a portion of the sealant 22 by means of vacuum injection or the like. The sealing port is closed with resin material to seal the injected liquid crystal. Thus, the tablet 4 having the constitution of liquid crystal cell type is fabricated. Before integrating the fabricated tablet 4 with the liquid crystal display cell 2, the upper substrate 20 is pressed down in advance by means of a roller or the like to allow the coordinates detecting electrodes 15 and 16 securely conduct with each other through the conductive particles 24 by providing holes in the orientation films 17 and 18 at positions up and down the conductive particles 24.

Thus, in the above-mentioned preferred embodiment, the tablet 4 has the liquid crystal cell type in which the compensating liquid crystal layer 21 is arranged between the opposing coordinates detecting electrodes 15 and 16, so that, unlike the prior technology in which a phase difference film is used to cancel the wavelength scattering caused by double refraction of STN liquid crystal display cell, wavelength scattering cancel performance is not deteriorated even in high-temperature environment such as 40° C. or higher for example. Therefore, not always in room-temperature environment, but also in high-temperature environment, undesired color development due to wavelength scattering can be avoided. In addition, because the resilient nonconductive spacer particles 23 and the conductive particles 24 smaller than the particles 23 in size are mixed in the compensating liquid crystal layer 21, a local and selective input operation can be performed for sure in which, below the upper substrate 20 at a position pressed by the finger or the like, the opposing coordinates detecting electrodes 15 and 16 conduct with each other through the conductive particles 24, thereby hampering no tablet capability. Consequently, the table-integrated liquid crystal display apparatus according to the present invention is suitably applied to a product for use on vehicles for which operation in high-temperature environment is expected such as car navigation for example, always providing good display quality and therefore a high added value.

In the above-mentioned preferred embodiment, the tablet 4 is of analog type as shown in FIG. 2. It will be apparent to those skilled in the art that the present invention is applicable to a digital tablet in which the coordinates detecting electrodes are formed on the upper and lower substrates at the opposing sides thereof in a matrix.

Figure 3:
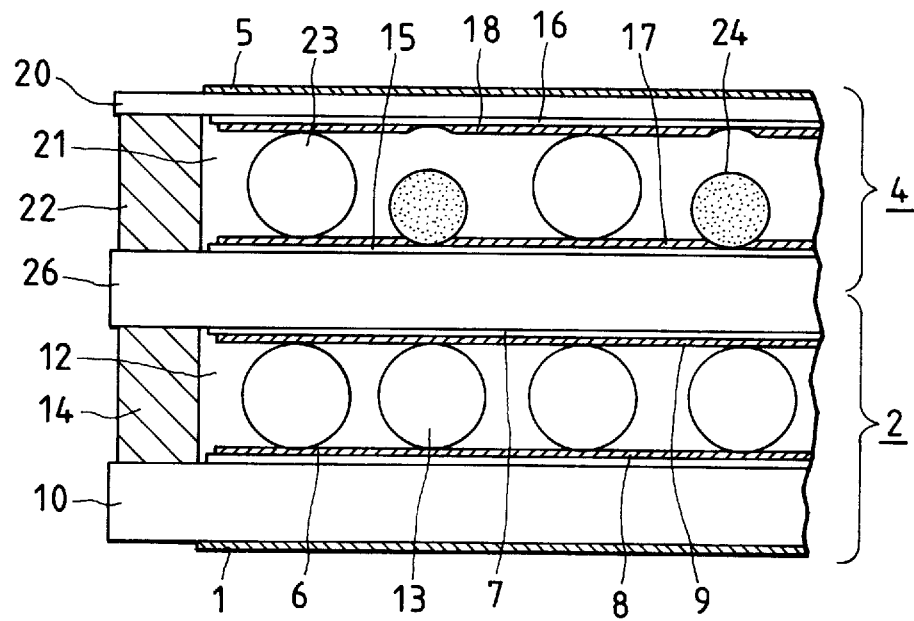
FIG. 3 is an overall cross sectional view illustrating a tablet-integrated liquid crystal display apparatus practiced as another preferred embodiment of the present invention.

Referring to FIG. 3, there is shown an overall cross sectional view illustrating another preferred embodiment of the present invention. In the figure, components similar to those previously described with FIG. 1 are denoted by the same reference numerals.

The preferred embodiment of FIG. 3 has a constitution in which a glass substrate 26 formed on one side thereof with transparent electrodes 7 and an orientation film 9 for a liquid crystal display cell 2 and on other side with coordinates detecting electrodes 15 and an orientation film 17 for a tablet 4 is arranged between a liquid crystal layer 12 and a compensating liquid crystal 21. Thus, the upper glass substrate 11 and the lower substrate 19 of the embodiment of FIG. 1 are made common to omit the buffer 3. Thus, building in the glass substrate 26 designed to provide a component common to the liquid crystal cell 2 and the tablet 4 by providing electrode-formed surfaces on both upper and lower surfaces and providing orientation processing on the surfaces eliminates use of one substrate as well as the buffer, resulting in the reduced number of components and reduced thickness of the apparatus.

As described and according to the present invention, the tablet-integrated liquid crystal display apparatus uses a tablet with a compensating liquid crystal layer arranged between opposing coordinates detecting electrodes instead of a phase difference film anticipated for performance deterioration due to thermal expansion, thereby preventing the undesired color development due to double refraction of light passing the STN liquid crystal display cell from occurring also in high-temperature environment. Further, because the compensating liquid crystal layer is mixed with nonconductive spacer particles and conductive particles smaller than the spacer particles in size, a local and selective operation can be performed for sure without hampering the tablet capability. Thus, application of this interactive display apparatus to a product for use on vehicles such as car navigation always provides good display quality and therefore a high added value.

While the preferred embodiments of the present invention have been described using specific terms, such description is for illustrative purposes only, and it is to be understood that changes and variations may be made without departing from the spirit or scope of the appended claims.

What is claimed is:

1. A tablet-integrated liquid crystal display apparatus comprising:

a liquid crystal display cell having a liquid crystal layer oriented in a twisted manner by 180° or more between a pair of first transparent substrates, said pair of first transparent substrates having inside surfaces with transparent electrodes disposed thereon;

a tablet arranged on a front side of the liquid crystal display cell, said tablet including a pair of second transparent substrates, said pair of second transparent substrates having inside surfaces with coordinate detecting electrodes disposed thereon; and wherein said liquid crystal display cell comprises a bottom portion of said tablet-integrated liquid crystal display apparatus and said tablet comprises a top portion of said tablet-integrated liquid crystal display apparatus, and further, wherein a pair of polarizing plates are disposed on said bottom and top portions, wherein a compensating liquid crystal layer for canceling wavelength scattering caused by double refraction of light passing through said liquid crystal display cell is arranged between said pair of second transparent substrates of said tablet, and wherein non-conductive spacers and conductive substances, lower in height than that of said non-conductive spacers, are disposed in the compensating liquid crystal layer.

2. A tablet-integrated liquid crystal display apparatus as claimed in claim 1, wherein said conductive substances are fixed to one of the transparent substrates of said pair of second transparent substrates of said tablet.

3. A tablet-integrated liquid crystal display apparatus as claimed in claim 1, wherein each said conductive substance is made of a metal-plated plastic bead.

4. A tablet-integrated liquid crystal display apparatus comprising:

a lower transparent substrate;

an intermediate transparent substrate positioned over said lower transparent substrate;

a liquid crystal layer, twisted by at least 180°, disposed between said lower transparent substrate and said intermediate transparent substrate;

an upper transparent substrate positioned over said intermediate transparent substrate;

a compensating liquid disposed between said upper transparent substrate and said intermediate transparent substrate for canceling wave length scattering caused by a double refraction of light;

a plurality of conductive substances disposed in said compensating liquid;

a plurality of non-conductive spacers disposed in said compensating liquid;

transparent electrodes disposed on an upper surface of said lower transparent substrate and on a lower surface of said intermediate transparent substrate;

coordinate detecting electrodes disposed on an upper surface of said intermediate transparent substrate and on a lower surface of said upper transparent substrate; and polarizing plates disposed on an upper surface of said upper transparent substrate and on a lower surface of said lower transparent substrate.

5. A tablet-integrated liquid crystal display apparatus of claim 4, wherein each said conductive substance comprises a metal-plated plastic bead.

6. A tablet-integrated liquid crystal display apparatus of claim 4, wherein said conductive substances are fixed to said intermediate transparent layer.

7. A tablet-integrated liquid crystal display apparatus of claim 4, wherein said conductive substances are fixed to said upper transparent layer.

* * * * *